April 29, 1969  R. T. GRIFFITH  3,441,123
CONVEYOR

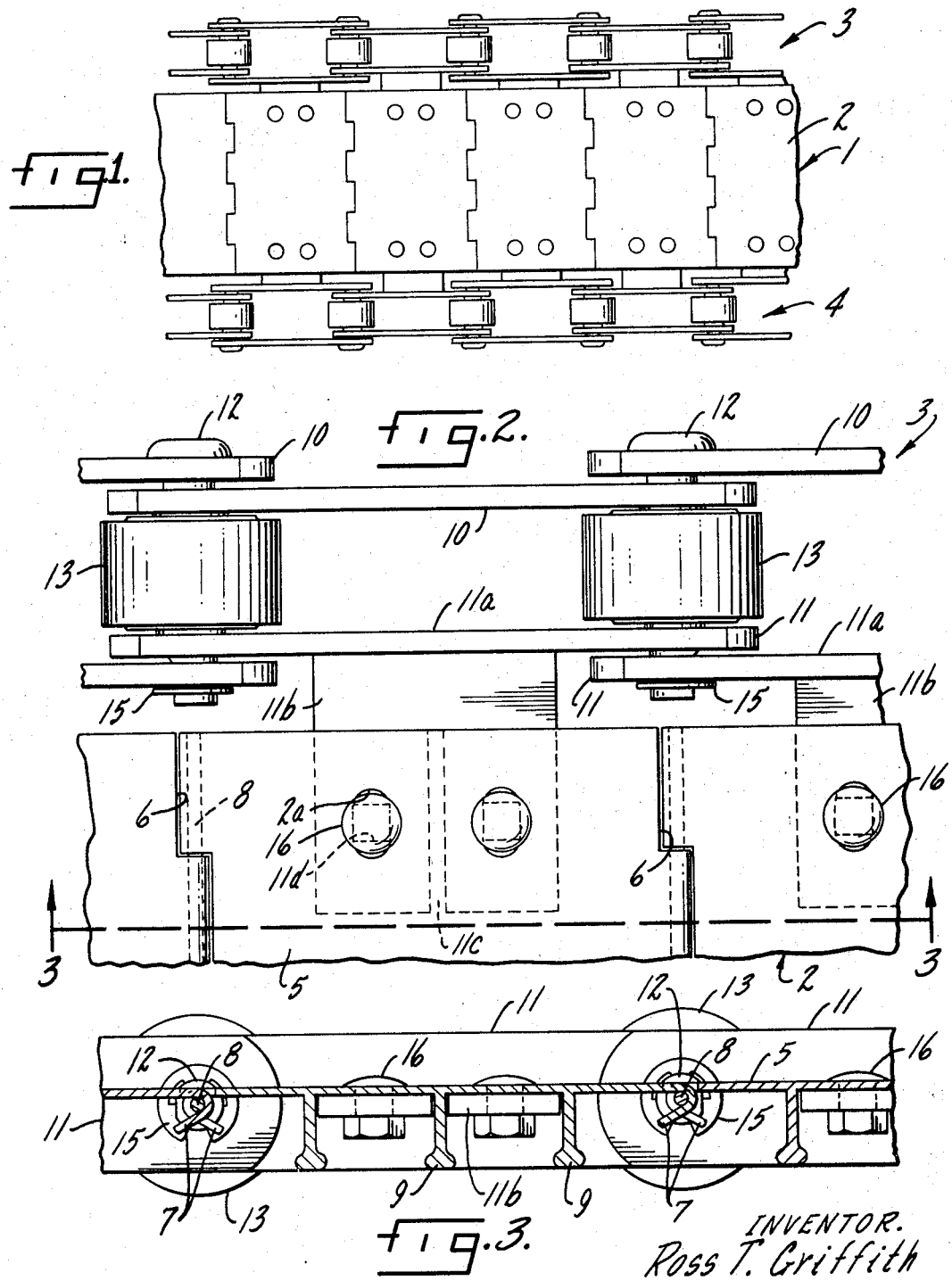

Filed June 19, 1967  Sheet 2 of 2

INVENTOR.
Ross T. Griffith,
BY Parker & Carter
Attorneys.

United States Patent Office 3,441,123
Patented Apr. 29, 1969

3,441,123
CONVEYOR
Ross T. Griffith, Kalamazoo, Mich., assignor to North American Aluminum Corporation, Kalamazoo, Mich., a corporation of Delaware
Filed June 19, 1967, Ser. No. 646,959
Int. Cl. B65g *15/48*
U.S. Cl. 198—195      2 Claims

ABSTRACT OF THE DISCLOSURE

An articulated, continuous belt conveyor formed substantially of a plurality of identical, extruded aluminum parts, including identical flights hinged to form a conveyor bed, a pair of conveyor chains, the inner links of which are substantially identical and include central pads supporting the bed and the chain pintles being aligned with the points of articulation of the bed.

---

This invention relates to conveyors and has particular relation to a conveyor usable in the conveying of foods and similar items sensitive to contact with dirt, rust and particular types of metals.

One purpose of the invention is to provide a conveyor formed principally of aluminum.

Another purpose is to provide a conveyor of maximum simplicity and economy in manufacture, shipment and assembly.

Another purpose is to provide a conveyor which can be assembled from a minimum number of distinct elements.

Another purpose is to provide a conveyor formed primarily from extruded aluminum elements.

Another purpose is to provide a conveyor requiring less moving power.

Another purpose is to provide a conveyor of minimum weight and adequate strength.

Another purpose is to provide a conveyor having the advantages of both wooden and steel conveyors but without the disadvantages of either.

Other purposes will appear from time to time during the course of the specification and claims.

The invention is illustrated more or less diagrammatically in the accompanying drawings in which:

FIGURE 1 is a partial top plan view;

FIGURE 2 is a partial top plan view on an enlarged scale;

FIGURE 3 is a view taken on the line 3—3 of FIGURE 2;

Like parts are indicated by like numerals throughout the specification and drawings.

Figure 4:
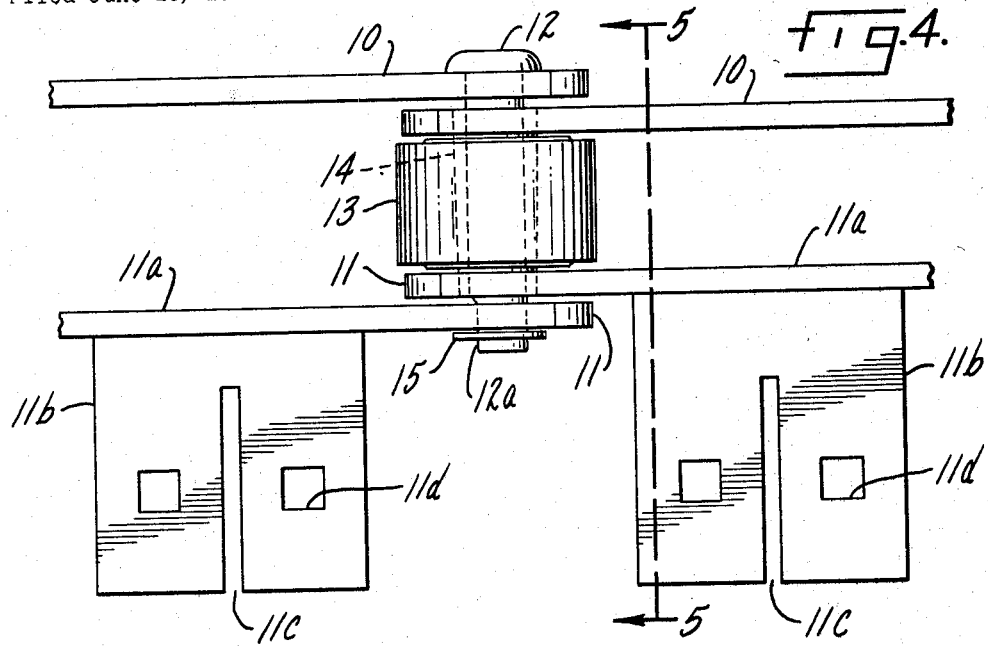
FIGURE 4 is a detail view.

Referring now to the drawings, and particularly to FIGURE 1, the numeral 1 general designates an endless conveyor bed. The bed 1 is formed of a plurality of articulated or rotatably interlocked, paralleling, identical flights 2. The flights 2 are carried by and between a pair of spaced, parallel conveyor chains indicated, respectively, at 3 and 4.

As may be best seen in FIGURES 2 and 3, each of the flights 2 comprises an elongated planar member having a smooth, flat upper surface 5, the opposite longitudinal edges of which are cut away or recessed at spaced points therealong, one such recess being indicated, for example, at 6. The longitudinal edge portions between recesses 6 have their outer end portions turned downwardly and inclined rearwardly, as indicated at 7 in FIGURE 3. It will be observed that the recesses of each flight 2 are identical in number, position and extension and that the recesses along one edge of each flight 2 are in alignment and of equal longitudinal extension with the nonrecessed portions of the opposite edge of said flight. Thus a mating of identical flights 2 is achievable, as indicated in FIGURE 1 and, in part, in FIGURE 2. A hinge member, which may comprise the wire 8, extends through the channel formed by interpenetrating nonrecessed edge portions 7, as may be clearly seen in FIGURES 2 and 3. The flights are extruded through a die shaped as indicated best in FIGURE 3, for example. As extruded, the opposite longitudinal edges are formed bent as shown, thus eliminating any need for forming a socket or channel in the flight-forming step.

Strengthening ribs 9 extend from and beneath each flight 2 and extend in parallel relationship substantially the full longitudinal extension of the flights 2.

The chains 3 and 4 are identical. Each is formed of a plurality of outer identical link pieces 10 and a plurality of substantially identical inner link pieces 11. Pintles 12 extend through each set of interpenetrating inner and outer link sets and each of the pintles 12 carries a roller 13. It will be observed that a set of inner and outer link pieces 10, 11 are spaced apart a distance sufficient to receive the roller 13 and a shouldered drive bushing 14 therebetween. Another set of inner and outer link pieces 10, 11 are spaced apart a distance sufficient to receive the end portions of adjacent link pieces, bushing 14 and roller 13. The inner ends of pintles 12 are secured by a suitable split ring element such as that shown at 15, positioned for engagement with the opposed inner surface of a link piece 11.

Each of the inner link pieces 11 comprises a chain link portion 11a and an inwardly extending, flight-supporting pad portion 11b. The pad 11b is centrally slotted as indicated at 11c for reception of one of the ribs 9, as may be best seen for example in FIGURE 3. The portions 11b are apertured as indicated at 11d for reception of suitable fasteners, such as those indicated at 16, to secure the flight 2 to the link piece 11. The pads 11b are of two extensions to provide for alignment of all apertures 11d in parallel with chains 3 and 4. It will be observed, however, that pads 11b could be identical in extension and the apertures 11d could be positioned in alternating offset locations thereon in order that fasteners 16, when desired, shall be positioned in alignment on bed 1.

Figure 5:
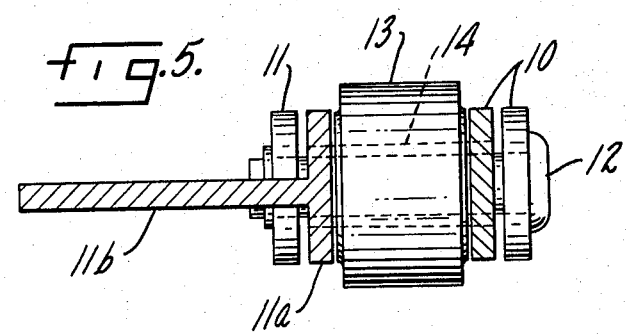
FIGURE 5 is a view taken on the line 5—5 of FIGURE 4.

As may be best seen in FIGURE 5, the inner link piece 11 is generally T-shaped in cross section, the pad portion 11b extending perpendicularly inwardly from the inner surface of portion 11a and centrally thereof.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention.

The use and operation of the invention are as follows:

Outer link pieces 10 may be extruded of aluminum, the die opening employable for this purpose taking the cross-sectional form of the piece 10 as may be seen, for example, in the right-hand portion of FIGURE 5. The elongated aluminum strip thus produced may then be cut and apertured to form the piece illustrated, for example, in FIGURE 6. Openings having diameters sufficient to receive the pintle 12 and to receive the bushing 14 are then formed adjacent the opposite ends of the pieces 10, the openings 10a of FIGURE 6 being those formed for reception of pintles 12, for example.

Figure 6:
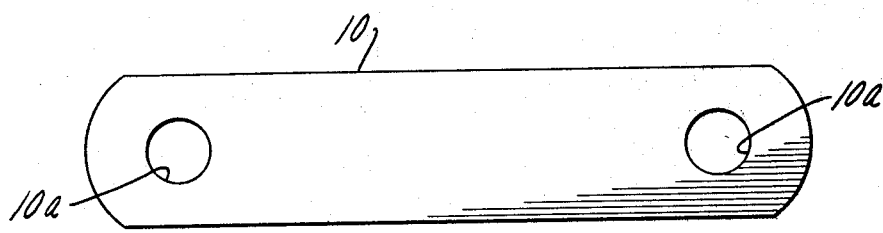
FIGURE 6 is a plan view of an element of the conveyor.

Similarly, the substantially identical inner link pieces 11 may be formed of an aluminum extrusion, the opening in the die employable for this purpose taking the T-shaped form of a cross section of the piece 11, as appears, for example, in the left-hand portion of FIGURE 5. After such extrusion the portion 11b which, in the extrusion, would extend the full length of the portion 11a, is reduced to the size shown by removal of its opposite end portions and the slot 11c is formed. The elongated portion 11a is cut and apertured to form end portions corresponding substantially to those of the piece 10 as shown in FIGURE 6. The apertures in some portions 11a are of a size to receive bushing 14 while those in other portions 11a are smaller and have a flat positioned to engage a corresponding flat on pintle 12, as shown for example at 12a. The apertures 11d are formed in the desired locations on portions 11b. To provide alignment of the fasteners 16, when pads 11b are of identical extension, the apertures 11d in one-half of the portions 11b will be offset from the apertures 11d in the remaining half of the portions 11b to accommodate the alternating offset relationship of the inner portions 11a when assembled in chains 3, 4. In those instances in which alignment of fasteners 16 is not deemed necessary or when pads 11b differ in extension as shown, the apertures 11d could, of course, be located in the same position on all portions 11b.

A set of link pieces 10, 11 having larger apertures are arranged with rollers 13 and bushings 14 therebetween. A second set 10, 11 are positioned externally thereof and pintles 12 are extended through both pieces 10, bushing 14 and both pieces 11 as shown and snap ring 15 is placed. The provision of pads 11b as shown precludes the need for offset end portions on links 10, 11 to permit their interpenetration.

The individual flights 2 are arranged with the recesses 6 and opposed portions of the adjacent flights in interpenetrating relationship and the wires 8 are inserted through the resulting channel, as shown in FIGURE 3, to form the articulated conveyor surface or bed 1. The center rib 9 is positioned in slot 11c and the segments of portion 11b on opposite sides of slot 11c fill the spaces between said center rib and the ribs on opposite sides thereof, to provide a relatively solid, firm supporting and motion-transmitting relationship between chains 3, 4 and flights 2. The openings 2a in the flights 2 are aligned with the openings 11d, and fasteners 16 attach the conveyor bed 1 to pads 11b and thus to the chains 3, 4.

The resulting conveyor, being formed of aluminum, is effective to convey sensitive products, such as food, chemicals and the like, which may be subject to contamination by or interaction with other types of metals but free from such interaction with aluminum. The rollers 13 may conveniently be formed of "nylon" or "Delrin." The conveyor, being formed of aluminum, may be passed through a cleaning operation without concern for rust or resulting deterioration of the conveyor or contamination of products conveyed thereby. For example, wooden conveyors are employed in textile operations since washing is involved and previous metal conveyors produce unacceptable rust. Such wooden conveyors wear comparatively fast, however, and require frequent replacement. The conveyor of the invention, being of economical manufacture, enables the employment of a conveyor having a long and rustproof life.

There is claimed:

1. A conveyor formed of a pair of spaced, parallel chains, said chains being formed of inner and outer links with rollers therebetween, a plurality of adjacent, identical, articulated flights extending between said chains, the inner link pieces of said chains being substantially identical, each of said inner link pieces having an inwardly extending pad portion substantially centrally positioned thereon, each of said flights being attached to an opposed pair of said pad portions and including a longitudinal rib depending therefrom, each of said pad portions including a slot receiving an end portion of said rib, and additional ribs depending from said flights in parallel with and on opposite sides of said longitudinal rib, said pad portions substantially filling the space between the end portions of said additional ribs.

2. The method of forming a conveyor bed which comprises the steps of extruding an elongated T-shaped strip of aluminum, dividing said strip into T-shaped sections, removing opposite end portions of the major leg of each said section to form a pad, aperturing the opposite ends of the minor leg of each said section to form a link, extruding a flight having a smooth upper surface, a plurality of downwardly extending ribs beneath said surface and downwardly, rearwardly bent longitudinal edge portions paralleling said ribs, removing spaced portions of said edge portions and securing said flights to said pads.

References Cited

UNITED STATES PATENTS

| 1,566,516 | 12/1925 | Baker et al. | 198—195 |
| 1,883,528 | 10/1932 | Buck | 198—195 |
| 2,823,790 | 2/1958 | Sifford et al. | 198—196 |
| 3,042,185 | 7/1962 | Welch | 198—204 X |

FOREIGN PATENTS 753,901   8/1956   Great Britain.

EVON C. BLUNK, *Primary Examiner.*